(12) United States Patent
Stein et al.

(10) Patent No.: US 11,036,350 B2
(45) Date of Patent: Jun. 15, 2021

(54) GRAPHICAL USER INTERFACE FOR SPECIFYING 3D POSITION

(71) Applicant: DTS, Inc., Calabasas, CA (US)

(72) Inventors: Edward Stein, Soquel, CA (US); David Corsello, Redwood City, CA (US); Robert Demaa, Santa Monica, CA (US)

(73) Assignee: DTS, Inc., Calabasas, CA (US)

( * ) Notice: Subject to any disclaimer, the term of this patent is extended or adjusted under 35 U.S.C. 154(b) by 0 days.

(21) Appl. No.: 16/376,473

(22) Filed: Apr. 5, 2019

(65) Prior Publication Data

US 2019/0310759 A1 Oct. 10, 2019

Related U.S. Application Data

(60) Provisional application No. 62/654,435, filed on Apr. 8, 2018.

(51) Int. Cl.
*G06F 3/048* (2013.01)
*G06F 3/0481* (2013.01)
(Continued)

(52) U.S. Cl.
CPC ...... *G06F 3/04815* (2013.01); *G06F 3/04845* (2013.01); *G06F 3/04847* (2013.01);
(Continued)

(58) Field of Classification Search
CPC ............. G06F 3/04815; G06F 3/04845; G06F 3/04847; G06F 3/0482
See application file for complete search history.

(56) References Cited

U.S. PATENT DOCUMENTS

| | | | |
|---|---|---|---|
| 6,507,658 B1 | 1/2003 | Abel et al. | |
| 8,632,409 B2 * | 1/2014 | Wolfson | A63F 13/497 |
| | | | 463/42 |

(Continued)

FOREIGN PATENT DOCUMENTS

WO WO-2019199610 A1 10/2019

OTHER PUBLICATIONS

"International Application Serial No. PCT/US2019/026101, International Search Report dated Jul. 11, 2019", 4 pgs.
(Continued)

*Primary Examiner* — Nicholas Augustine
(74) *Attorney, Agent, or Firm* — Schwegman Lundberg & Woessner, P.A.

(57) ABSTRACT

A graphical user interface (GUI) can specify a three-dimensional position. The GUI can include a puck that is user-positionable in two dimensions. A distance between the puck and a reference point on the graphical user interface can determine a radius of the three-dimensional position. An azimuthal orientation of the puck with respect to the reference point can determine an azimuthal angle of the three-dimensional position. The GUI can include an elevation controller, separate from the puck, to specify an elevation of the three-dimensional position. The elevation controller can specify an elevation angle, which can determine a position along the surface of a virtual sphere as a function of elevation angle. In addition, or alternatively, the elevation controller can specify an elevation height, which can determine a position along a line, such as directly upward or downward, as a function of elevation height.

20 Claims, 6 Drawing Sheets

(51) Int. Cl.
*H04S 7/00* (2006.01)
*H04S 3/00* (2006.01)
*G06F 3/0484* (2013.01)
*G06F 3/01* (2006.01)

(52) U.S. Cl.
CPC .............. *H04S 3/008* (2013.01); *H04S 7/303* (2013.01); *H04S 2400/01* (2013.01); *H04S 2400/11* (2013.01); *H04S 2420/01* (2013.01); *H04S 2420/11* (2013.01)

(56) References Cited

U.S. PATENT DOCUMENTS

| | | | |
|---|---|---|---|
| 8,712,061 B2* | 4/2014 | Jot | H04S 3/02 381/17 |
| 9,154,896 B2* | 10/2015 | Mahabub | H04S 5/00 |
| 9,702,977 B2* | 7/2017 | Holz | G01S 17/89 |
| 9,826,328 B2* | 11/2017 | Mehta | H04S 7/30 |
| 9,952,739 B2 | 4/2018 | Milne et al. | |
| 9,986,363 B2 | 5/2018 | Bošnjak et al. | |
| 2004/0111171 A1* | 6/2004 | Jang | H04S 7/30 700/94 |
| 2007/0136679 A1* | 6/2007 | Yang | H04N 21/4334 715/772 |
| 2007/0146325 A1 | 6/2007 | Poston et al. | |
| 2007/0200871 A1* | 8/2007 | Lee | G06F 3/0213 345/619 |
| 2008/0253592 A1 | 10/2008 | Sanders et al. | |
| 2011/0221692 A1* | 9/2011 | Seydoux | G06F 3/04883 345/173 |
| 2013/0154930 A1* | 6/2013 | Xiang | G06F 3/167 345/158 |
| 2014/0177847 A1* | 6/2014 | Strub | H04R 5/027 381/18 |
| 2014/0198918 A1* | 7/2014 | Li | H04S 7/30 381/26 |
| 2014/0267298 A1 | 9/2014 | Milne et al. | |
| 2014/0277647 A1 | 9/2014 | Milne et al. | |
| 2014/0281979 A1 | 9/2014 | Milne et al. | |
| 2014/0281984 A1 | 9/2014 | Milne et al. | |
| 2015/0243105 A1 | 8/2015 | Abovitz et al. | |
| 2015/0248792 A1 | 9/2015 | Abovitz et al. | |
| 2017/0257724 A1 | 9/2017 | Bosnjak et al. | |
| 2017/0366912 A1* | 12/2017 | Stein | H04S 7/304 |

OTHER PUBLICATIONS

"International Application Serial No. PCT/US2019/026101, Written Opinion dated Jul. 11, 2019", 7 pgs.

Stein, Edward, "Extended Depth Ambisonics Rendering with Six Degrees of Freedom", Proceedings of the 21st International Conference on Digital Audio Effects (DAFx-18), (2018), 7 pgs.

* cited by examiner

THREE-DIMENSIONAL LOCATION IN SPHERICAL COORDINATES:
(AZIMUTHAL ANGLE φ, ELEVATION ANGLE θ, RADIUS R)

THREE-DIMENSIONAL LOCATION IN CARTESIAN COORDINATES:
$(X, Y, Z) = (R \cos\theta \sin\varphi, R \sin\theta, -R \cos\theta \cos\varphi)$

GRAPHICAL USER INTERFACE FOR SPECIFYING 3D POSITION

CROSS-REFERENCE TO RELATED APPLICATION

This application claims the benefit of U.S. Provisional Application No. 62/654,435, filed Apr. 8, 2018, which is hereby incorporated by reference in its entirety.

FIELD OF THE DISCLOSURE

The technology described in this document relates generally to a two-dimensional (2D) graphical user interface (GUI) used to specify three-dimensional (3D) positions of virtual objects, such as audio objects or audio signals.

BACKGROUND OF THE DISCLOSURE

Many applications require specifying a three-dimensional position using a two-dimensional graphical user interface. For example, mixing sound, such as for a cinematic production or a video game, can require specifying a three-dimensional position of a sound source. As a specific example, a sound of an airplane flying overhead can involve specifying a position for the airplane and positioning a sound of an airplane engine at the specified position.

Specifying the position can be difficult or impossible with existing two-dimensional graphical user interfaces. For example, it may not be possible to dynamically specify a position of a (virtual) airplane as it flies by at a constant height, using existing two-dimensional graphical user interfaces.

As a result, there exists a need for an improved graphical user interface, which can specify a position of a (virtual) object as the object moves through (virtual) space in three dimensions.

BRIEF DESCRIPTION OF THE DRAWINGS

Corresponding reference characters indicate corresponding parts throughout the several views. Elements in the drawings are not necessarily drawn to scale. The configurations shown in the drawings are merely examples and should not be construed as limiting the scope of the invention in any manner.

DETAILED DESCRIPTION

A graphical user interface (GUI) can specify a three-dimensional position. The GUI can include a puck that is user-positionable in two dimensions. A distance between the puck and a reference point on the graphical user interface can determine a radius of the three-dimensional position. An azimuthal orientation of the puck with respect to the reference point can determine an azimuthal angle of the three-dimensional position. The GUI can include an elevation controller, separate from the puck, to specify an elevation of the three-dimensional position. The elevation controller can specify an elevation angle, which can determine a position along the surface of a virtual sphere as a function of elevation angle. In addition, or alternatively, the elevation controller can specify an elevation height, which can determine a position along a line, such as directly upward or downward, as a function of elevation height.

Specifying the radius and azimuth using a positionable puck, and specifying the elevation using a separate elevation controller can provide flexibility over existing graphical user interfaces. For example, the graphical user interface discussed herein can further include a mode selector that allows locking and unlocking of a position parameter, such that when the position parameter is locked, user-initiated movement of the puck allows specification of the three-dimensional position only along a surface of a virtual plane or over a surface of a virtual sphere. As a specific example, when a height lock mode is selected, user-initiated movement of the puck can allow specification of the three-dimensional position only within a virtual plane having a constant elevation, and the distance between the puck and the reference point on the graphical user interface determines the radius of the three-dimensional position and additionally determines an elevation angle of the three-dimensional position, the elevation angle corresponding to an intersection between a virtual sphere having the determined radius and the virtual plane having the constant elevation. Such a height lock mode can be useful for the specific example of an airplane flying overhead at a constant height. Using existing graphical user interfaces with spherical controls, it can be cumbersome or impossible to treat the specific example of an airplane flying overhead at a constant height.

In a specific example, when a radial lock mode is selected, user-initiated movement of the puck and/or elevation angle control allows specification of the three-dimensional position only around the surface of a virtual sphere with a constant radius from the reference point. Such a radial lock mode can be useful for the specific example of objects such as special effects orbiting the observer. In this specific example, because the special effects are at a constant radius away from the observer, the special effects can retain a constant volume level as they orbit the observer. Using existing graphical user interfaces with Cartesian controls, it can be cumbersome or impossible to create these constant-radius orbits.

Figure 1:
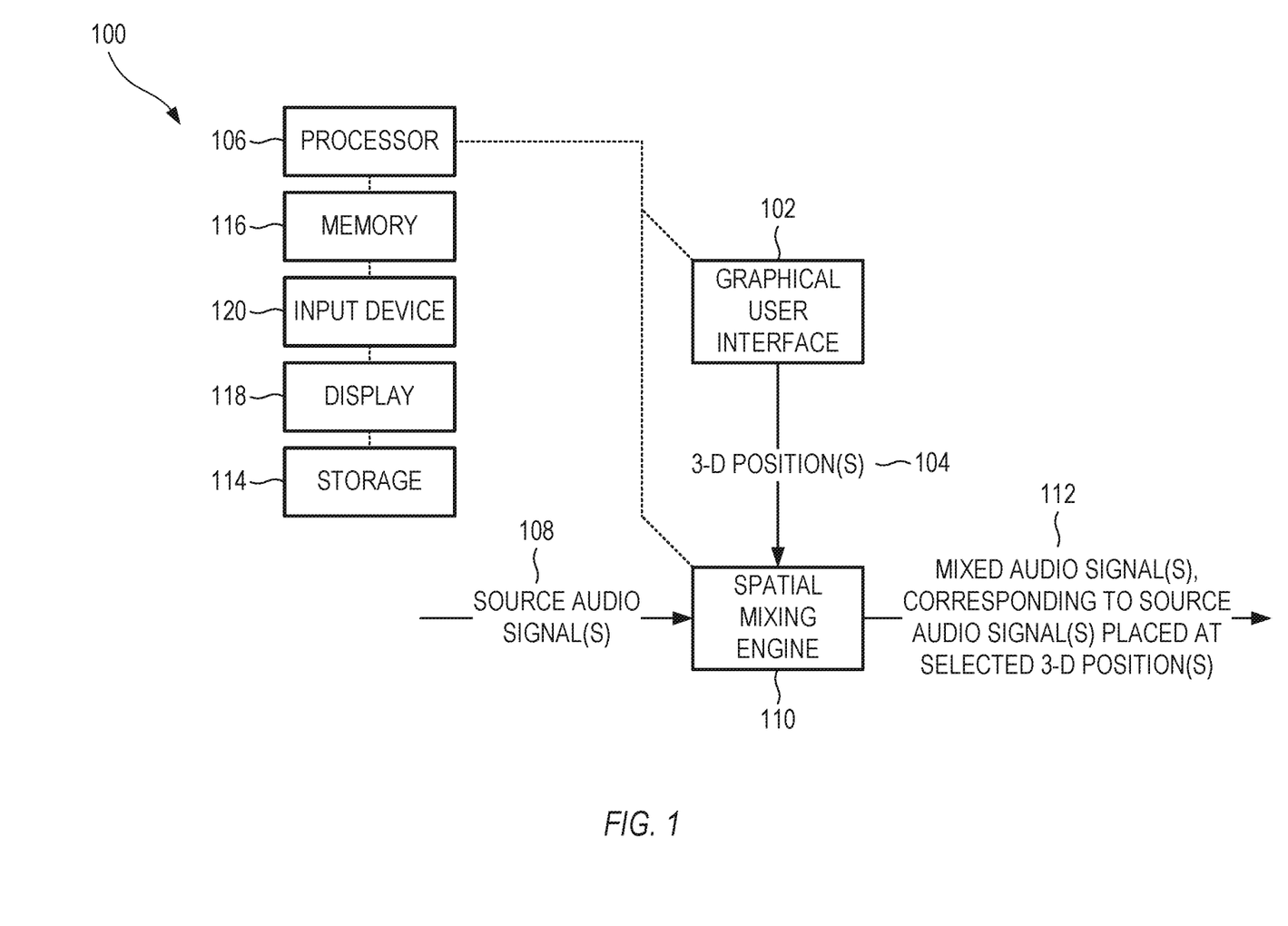
FIG. 1 shows an example of a system that uses a graphical user interface to specify a three-dimensional position, in accordance with some embodiments.

FIG. 1 shows an example of a system 100 that uses a graphical user interface 102 to specify a three-dimensional position 104, in accordance with some embodiments. In the example of FIG. 1, the system 100 can produce a mix of one or more audio signals to account for three-dimensional placement of the audio signals. In other examples, other types of systems, including systems that postpone audio mixing as a downstream operation or do not use audio, can use the graphical user interface 102, as discussed below, to specify a three-dimensional position 104.

A processor 106 can execute instructions stored in memory 116, such that when the instructions are executed on the processor 106, the instructions cause the processor 106 to generate the graphical user interface 102 and present the graphical user interface 102 on a display 118 to a user. The graphical user interface 102 can accept input from the user through an input device 120 such as a mouse or track-ball, a keyboard, and/or a touch-sensitive screen, which can optionally be the display. Through the graphical user interface 102, the user can reposition user-positionable elements in the graphical user interface 102 to desired positions, such as by clicking on the elements, or dragging the elements to the desired positions. Through the graphical user interface 102, the user can enter particular numerical values, such as by highlighting a direct entry box on the graphical user interface and entering a numerical value through a keyboard, a touch pad, or a virtual keyboard shown on the touch-sensitive display.

In some examples, the system 100 can operate as an authoring tool, which can trace a time-varying path of one or more virtual objects over time. When used as an authoring tool, the system 100 can specify three-dimensional positions, and times at which the virtual object is present at the specified positions and can save the specified positions and times in random access memory (RAM) or one or more files on a storage device 114 coupled to the processor 106. The storage device 114 can be a local storage device or can be coupled via a wired or wireless network to a server.

In some examples, the system 100 can operate as an automated or rendering tool, which can retrieve a time-varying path of one or more virtual objects over time. When used as an automated rendering tool, the system 100 can apply three-dimensional positions in random access memory (RAM) or one or more files on a storage device 114 coupled to the processor 106.

A spatial mixing engine 110 can receive the three-dimensional position(s) 104, either directly from the processor 106 or from one or more files saved on the storage device coupled to the processor 106. The spatial mixing engine 110 can process one or more source audio signals 108, by placing each signal 108 at the corresponding specified three-dimensional position 104, and simulating propagation of the signals from the specified positions to a listener. In some examples, the listener can be positioned at an origin of the three-dimensional coordinate system. In some examples, the listener can be a single point, positioned at the origin. In other examples, the listener can be simulated as having two ears on opposite sides of the origin. In some examples, the listener can have a fixed orientation, with respect to the three-dimensional coordinate system. In some examples. In other examples, such as for virtual reality or augmented reality video games, the listener can have a time-varying orientation, with respect to the three-dimensional coordinate system, depending on a real-time orientation of a headset or a head tracker or eye-tracker.

In some examples, such as the configuration of FIG. 1, the graphical user interface 102 and the spatial mixing engine 110 can be coupled to the same processor 106. For example, the processor 106 can run a self-contained audio mixing suite, in which the graphical user interface 102 specified positions 104, and the spatial mixing engine uses those positions to perform the audio mixing and generate mixed audio signals 112.

In some examples, the graphical user interface 102 can be coupled to a first processor, and the spatial mixing engine 110 can be coupled to a second processor. For example, the first processor can run software that specifies the positions of the audio elements, and the second processor can run software that performs the spatial mixing of the audio signals at the specified positions. Other configurations are also possible.

In some examples, the processor 106 can display a graphical user interface 102, can receive a user-specified three-dimensional position through the graphical user interface 102, and can store data representing the specified three-dimensional position on a storage device 114 coupled to the processor 106. The graphical user interface 102 is shown in detail in FIG. 4 and is discussed below.

Figure 2:
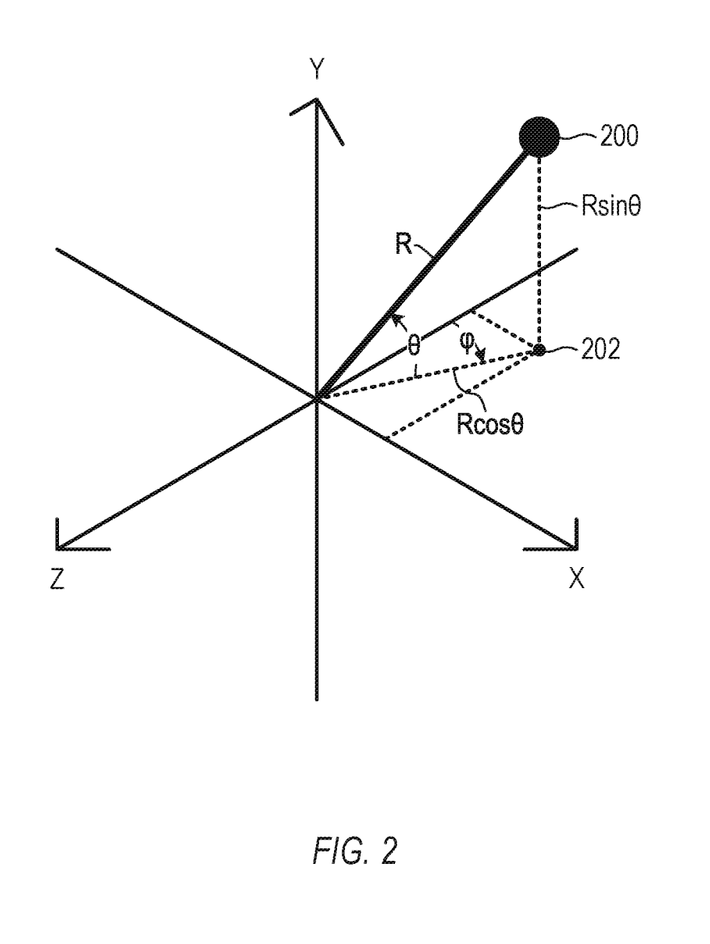
FIG. 2 shows an example of a three-dimensional position, in accordance with some embodiments.

FIG. 2 shows an example of a three-dimensional position 200, in accordance with some embodiments. In general, a three-dimensional position 200 can be specified by three coordinates in a specified coordinate system. The system of FIG. 1 can optionally generate one or more three-dimensional positions, and save them to a storage device, optionally with suitable saved times at which a virtual object is intended to be present at the saved positions.

Figure 3:
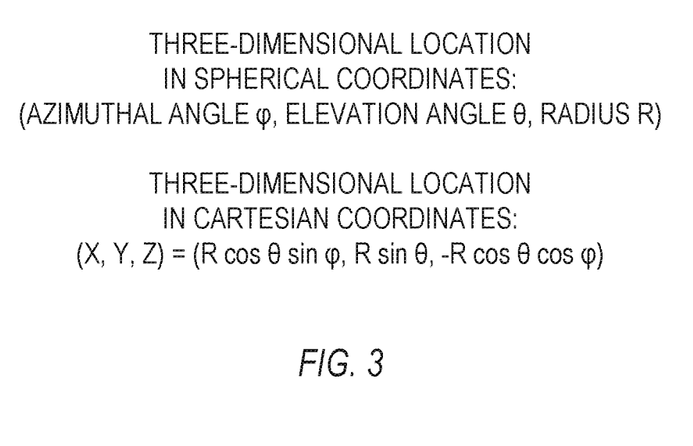
FIG. 3 shows two examples of three-dimensional coordinate systems, in accordance with some embodiments.

FIG. 3 shows two examples of three-dimensional coordinate systems, in accordance with some embodiments. The coordinate systems and sign conventions of FIGS. 2 and 3 are but mere examples, and other coordinate systems and sign conventions can also be used. Because well-defined equations exist to convert from any suitable three-dimensional coordinate system to any other suitable three-dimensional coordinate system, the three-dimensional positions can be saved, retrieved, and/or used by the processor in any suitable three-dimensional coordinate system.

In the graphical user interface discussed in detail below, a user is positioned above a horizontal plane, looking down on the horizontal plane. The origin, at position (0, 0, 0), is set to be the position of an observer, such as a listener. The x-axis can extend in a positive direction to the right of the origin. In some examples, the x-axis can correspond to a front-back direction. The z-axis can extend in a positive direction below the origin (e.g., downward when viewed on the graphical user interface). In some examples, the z-axis can correspond to a lateral direction. The y-axis can extend in a positive toward the viewer, so that y-values are positive "out of the plane", and y-values are negative "into the plane". In some examples, the y-axis can correspond to a height direction or an elevation direction, where positive y-values can correspond to heights above the listener, and negative y-values can correspond to heights below the listener. These x, y, and z directions can define a Cartesian coordinate system, so that a position 200 can be defined by three values (X, Y, Z).

For the graphical user interface discussed below, it is more convenient to discuss operations in the context of a spherical coordinate system. Many sign conventions and naming conventions exist for spherical coordinates. It should be noted that any of these sign conventions and naming conventions can be used with the graphical user interface discussed below, because one can easily be converted to another in a deterministic manner by known, well-defined equations.

The first of three spherical coordinate quantities is an azimuthal angle, denoted by angle $\varphi$, and expressed in degrees. Alternatively, radians or any other suitable angular units can also be used. The values of the azimuthal angle extend from zero degrees, inclusive, to 360 degrees, exclusive. In the context of the graphical user interface shown below, the azimuthal angle is zero along the negative z-axis (upward, from the origin), and increases in a clockwise direction (to the right, from the negative z-axis). Along the positive x-axis (to the right, from the origin), the azimuthal angle is 90 degrees. Along the positive z-axis (downward, from the origin), the azimuthal angle is 180 degrees. Along the negative x-axis (to the left, from the origin), the azimuthal angle is 270 degrees.

The second of three spherical coordinate quantities is an elevation angle, denoted by angle θ, and expressed in degrees. Alternatively, radians or any other suitable angular units can also be used. The values of the elevation angle extend from −90 degrees, inclusive, to +90 degrees, inclusive. In the context of the graphical user interface shown below, the elevation angle is zero at a height of zero, in the plane where y=0. Out of the page (e.g., toward the viewer), the elevation angle increases to a maximum value of +90 degrees, at which the three-dimensional position is located at the top of a virtual sphere. Into the page (e.g., away from the viewer), the elevation angle decreases to a minimum value of −90 degrees, at which the three-dimensional position is located at the bottom of the virtual sphere. In practice, in order to avoid losing azimuthal information, the graphical user interface can prevent the elevation angle from truly equaling −90 degrees or +90 degrees, instead confining its values between −89.9 degrees and +89.9 degrees, or between other suitable values that are close to but not equal to −90 degrees and +90 degrees, respectively. In this context, the elevation angle can approach −90 degrees or +90 degrees.

The third of three spherical coordinate quantities is a radius, denoted by quantity R, and expressed in units of distance or units of normalized distance. The values of radius extend from zero, inclusive, to any suitable positive value.

It is straightforward to convert between the spherical coordinates discussed above and Cartesian coordinates. FIG. 3 shows the specific relationships between these coordinate systems. For Cartesian coordinates (X, Y, Z), quantity X equals R cos θ sin φ, quantity Y equals R sin θ, and quantity Z equals −R cos θ cos φ. These equations can easily be inverted to convert from Cartesian coordinates to spherical coordinates.

It should be noted that the spherical coordinate system provides a convenient way of describing the various positional quantities but does not require that calculations be explicitly performed in spherical coordinates, or that positions be saved in spherical coordinate. In practice, many or all of the underlying calculations involved with determining the three-dimensional position are carried out in Cartesian coordinates. For example, when we say that positioning a puck on a graphical user interface "determines" a radius, we mean that the graphical user interface can read x- and y-location values of the puck location from the graphical user interface and can calculate corresponding x- and y-components of the three-dimensional position, such that the x- and y-components can be described by a radius value. In other words, "determining" a radius does not explicitly require that the processor carries out calculations to explicitly compute the radius value directly. Instead, the process can carry out calculations in any suitable manner to compute the three-dimensional position, and the three-dimensional position can have a radius value. Similar discussion applies to determining an azimuthal angle and determining an elevation angle.

Figure 4:
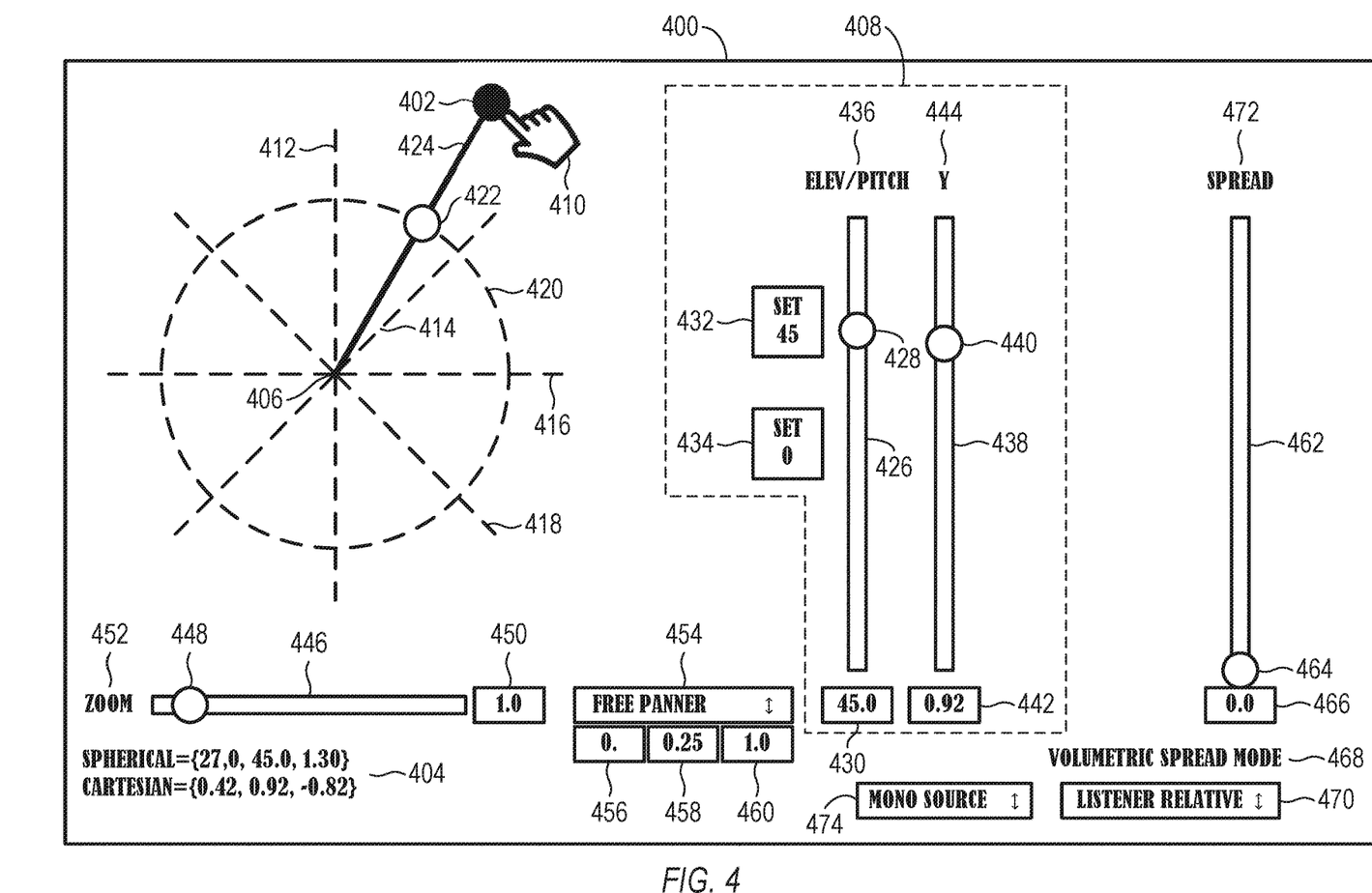
FIG. 4 shows an example of a graphical user interface for specifying a three-dimensional position, in accordance with some embodiments.

FIG. 4 shows an example of a graphical user interface 400 for specifying a three-dimensional position, in accordance with some embodiments. The graphical user interface 400 can be used with system 100, or with other suitable systems, to specify a three-dimensional position. The graphical user interface 400 of FIG. 4 is but one example of a graphical user interface; other suitable graphical user interfaces can also be used.

The graphical user interface 400 can include a puck 402 that is user-positionable in two dimensions to specify the three-dimensional position 404, such that a distance between the puck 402 and a reference point 406 on the graphical user interface 400 can determine a radius of the three-dimensional position 404, and an azimuthal orientation of the puck 402 with respect to the reference point 406 can determine an azimuthal angle of the three-dimensional position 404. The graphical user interface 400 can further include an elevation controller 408, separate from the puck 402, that is user-adjustable to specify an elevation of the three-dimensional position 404.

As explained above, using spherical coordinates merely provides a convenient way to describe the positions, and does not require that any underlying calculations are performed in spherical coordinates. In the example of FIG. 4, the azimuthal angle φ is 27.0 degrees, the elevation angle θ is 45.0 degrees, the radius R is 1.30 normalized units, Cartesian coordinate X equals R cos θ sin φ, or 0.42 normalized units, Cartesian coordinate Y equals R sin θ, or 0.92 normalized units, and Cartesian coordinate Z equals −R cos θ cos φ, or −0.82 normalized units.

The puck 402 can be shown as any suitable graphic element or icon, such as a circle, a filled circle, or others. The puck 402 can be user-positionable in two dimensions to specify the three-dimensional position 404. In the example of FIG. 4, the puck can be dragged by a cursor 410, although any suitable positioning mechanism can be used.

As explained above, a distance between the puck 402 and a reference point 406 on the graphical user interface 400 can determine a radius of the three-dimensional position 404, and an azimuthal orientation of the puck 402 with respect to the reference point 406 can determine an azimuthal angle of the three-dimensional position 404. To visually assist in positioning the puck 402, the graphical user interface 400 can optionally include one or more indicator lines.

A zero-degree indicator line 412 can extend vertically through the reference point 406 and can indicate a direction of zero azimuth angle. A 45-degree indicator line 414 can extend through the reference point 406 and can indicate a direction of a 45-degree azimuth angle. A 90-degree indicator line 416 can extend horizontally through the reference point 406 and can indicate a direction of a 90-degree azimuth angle. A 135-degree indicator line 418 can extend through the reference point 406 and can indicate a direction of a 135-degree azimuth angle. In some examples, the indicator lines 412, 414, 416, and 418 remain motionless on the graphical user interface 400 as the puck 402 is repositioned. A radial indicator line 420 can extend concentrically around the reference point 406. In some examples, the radial indicator 420 can take the form of shading and/or a color gradient within the graphical user interface 400, rather than a line.

A height indicator 422 can provide a visual indication of the elevation of the three-dimensional position 404. The height indicator 422 may not be user-positionable. The height indicator 422 can include an icon or graphic element that optionally differs from the puck 402, such as an open circle or others. The height indicator 422 can be positioned on a virtual line 424 extending between the puck 402 and the reference point 406. A distance between the height indicator 422 and the reference point 406 on the graphical user interface 400 can correspond to a radius of the three-dimensional position 404 multiplied by a cosine of an elevation angle of the three-dimensional position 404, such that the height indicator 422 is coincident with the puck 402 when the elevation angle is zero and approaches the reference point 406 when the elevation angle approaches −90 degrees or +90 degrees.

In some examples, the height indicator 422 and/or the puck 402 (and/or other indicators such as the virtual line 424) can be colored to provide a further indication of height. For example, one or both of these elements can have a first color when the height is positive, and a second color different from the first color, when the height is negative. In some examples, the color can change abruptly when going from positive to negative or negative to positive. In other examples, the color can change gradually.

The graphical user interface 400 can optionally include a zoom controller, which can radially expand or contract all the elements shown with the puck 402, so that the puck 402 and height indicator 422, together, move toward or away from the reference point 406 and thus trade off the effective radial control range with radial accuracy within the space of the GUI elements. The zoom controller elements 446, 448, and 450 can optionally be labeled with a zoom controller label 452. The zoom controller can include a zoom slider 446 and a zoom slider controller 448 that is user-positionable along the zoom slider 446 to set a value of the display zoom. The zoom controller can further include a zoom direct entry window 450 that can allow direct entry of a numerical value of the zoom. In some examples, when a user directly enters a numerical value into the zoom direct entry window 450, the zoom slider controller 448 automatically moves to the corresponding location on the zoom slider 446. In some examples, when a user positions the zoom slider controller 448 along the zoom slider 446, the zoom direct entry window 450 automatically displays the numerical value corresponding to the zoom slider controller 448 position.

The elevation controller 408 can optionally include two separate controllers that adjust the elevation in different ways. Other configurations may provide only one control, but facilitate mode selection as to which operational mode is active for a given object position.

A first controller, referred to as an elevation angle controller, can specify an elevation angle of the three-dimensional position. When the first controller is adjusted, the radius and the azimuthal angle remain unchanged, and the three-dimensional position moves along the surface of a sphere.

A second controller, referred to as an elevation height controller, can specify an elevation height value of the three-dimensional position, the elevation height value being a product of the radius of the three-dimensional position and a sine of an elevation angle of the three-dimensional position. (The elevation height is essentially the Cartesian y-coordinate of the three-dimensional position 404.) When the second controller is adjusted, the three-dimensional position moves vertically upward or downward, so that the azimuthal angle remains unchanged, but the radius grows or shrinks to keep the three-dimensional position on the surface of the (growing or shrinking) sphere.

These two controllers are discussed in detail below.

The elevation angle controller elements 426, 428, 430, 432, and 434 can optionally be labeled with an elevation angle controller label 436. In some examples, the elevation angle can be referred to as a pitch.

The elevation angle controller can include an elevation angle slider 426 and an elevation angle slider controller 428 that is user-positionable along the elevation angle slider 426, such that the following three effects occur. First, when the elevation angle slider controller 428 approaches a first end of the elevation angle slider, the elevation angle approaches −90 degrees and the three-dimensional position 404 approaches a bottom of a virtual sphere having the determined radius. Second, when the elevation angle slider controller 428 approaches a second end of the elevation angle slider 426, opposite the first end, the elevation angle approaches +90 degrees and the three-dimensional position approaches a top of the virtual sphere. Third, when the elevation angle slider controller 428 moves between the first and second ends of the elevation angle slider 426, the three-dimensional position moves along a surface of the virtual sphere.

The elevation angle controller can further include an elevation angle direct entry window 430 that can allow direct entry of a numerical value of the elevation angle. In some examples, when a user directly enters a numerical value into the elevation angle direct entry window 430, the elevation angle slider controller 428 automatically moves to the corresponding location on the elevation angle slider 426. In some examples, when a user positions the elevation angle slider controller 428 along the elevation angle slider 426, the elevation angle direct entry window 430 automatically displays the numerical value corresponding to the elevation angle slider controller 428 position.

The elevation angle controller can optionally further include a first elevation angle preset button 432, the pressing of which sets the elevation angle to a first elevation angle preset value. In the example of FIG. 4, the first elevation angle preset value is +45 degrees, although other suitable values can also be used. The elevation angle controller can optionally further include a second elevation angle preset button 434, the pressing of which sets the elevation angle to a second elevation angle preset value, different from the first elevation angle preset value. In the example of FIG. 4, the second elevation angle preset value is 0 degrees, although other suitable values can also be used. More or fewer than two elevation angle preset buttons can also be used.

The elevation height controller elements 438, 440, and 442 can optionally be labeled with an elevation height controller label 444. In some examples, the elevation height can be referred to as simply "y" or other suitable Cartesian coordinate axis designation.

The elevation height controller can include an elevation height slider 438 and an elevation height slider controller 440 that is user-positionable along the elevation height slider 438, such that when the elevation height slider controller 440 moves from a first position on the elevation height slider 438 corresponding to a first positive elevation height, to a second position on the elevation height slider 438 corresponding to a second positive elevation height greater than the first positive elevation height, the following three effects occur. First, the three-dimensional position 404 moves along a line that is orthogonal to a plane defined by a locus of positions at which the elevation angle is zero and moves farther away from the plane. In the coordinate system of FIG. 2, the three-dimensional position 404 moves along a line that is parallel to the y-axis. Second, the radius of the three-dimensional position 404 increases from a first radius value to a second radius value. Third, the elevation angle of the three-dimensional position 404 increases from a first positive elevation angle value to a second positive elevation angle value.

The elevation height controller can further include an elevation height direct entry window 442 that can allow direct entry of a numerical value of the elevation height (e.g., the actual Cartesian y-coordinate). In some examples, when a user directly enters a numerical value into the elevation height direct entry window 442, the elevation height slider controller 440 automatically moves to the corresponding location on the elevation height slider 438. In some examples, when a user positions the elevation height slider controller 440 along the elevation height slider 438, the elevation height direct entry window 442 automatically displays the numerical value corresponding to the elevation height slider controller 440 position.

The elevation height controller can optionally further include one or more elevation height preset buttons (not shown in FIG. 4), the pressing of which sets the elevation height to a specified value.

Because the elevation controller 408 can include two separate controllers that adjust the elevation in different ways, the following two conditions can occur. First, adjusting an elevation angle with the elevation angle controller changes an elevation height value shown on the elevation height controller and does not move the puck 402 on the graphical user interface 400. Second, adjusting an elevation height with the elevation height controller changes an elevation angle value shown on the elevation angle controller and moves the puck 402 radially with respect to the reference point 406 on the graphical user interface 400.

Thus far, it has been assumed that the motion of the puck 402 and the elevation controller 408, together, can freely determine the three-dimensional position 404 without any constraints on the three-dimensional position 404. As a result, this mode of operation can be referred to a "free panner" mode.

There may be instances when constraints are desirable, because they can help move from one three-dimensional position to another. For example, an airplane flying overhead may pass from one three-dimensional position to another, at the same elevation height (e.g., the same Cartesian y-value).

To accommodate these instances, the graphical user interface 400 can include a mode selector 454 that allows locking and unlocking of a position parameter, such that when the position parameter is locked, user-initiated movement of the puck 402 can allow specification of the three-dimensional position 404 only along a surface of a virtual plane defined by the locked position parameter or over a surface of a virtual sphere defined by the locked position parameter.

In some examples, the mode selector 454 can receive a user selection of a radius lock mode, such that while the radius lock mode is selected, the radius of the three-dimensional position 404 is fixed at a fixed radius value, and user-initiated movement of the puck 402 allows specification of the three-dimensional position only over a surface of a virtual sphere having the fixed radius value.

In some examples, the mode selector 454 can receive a user selection of a lateral lock mode, such that while the lateral lock mode is selected, user-initiated movement of the puck 402 allows specification of the three-dimensional position 404 only within a virtual plane (e.g., a plane parallel to the y-z plane) that is orthogonal to a lateral direction (e.g., the x-direction, along 416).

In some examples, the mode selector 454 can receive a user selection of a front/back lock mode, such that while the front/back lock mode is selected, user-initiated movement of the puck 402 allows specification of the three-dimensional position 404 only within a virtual plane (e.g., a plane parallel to the x-y plane) that is orthogonal to a front/back direction (e.g., the z-direction, along 412), the front/back direction (e.g., the z-direction, along 412) being orthogonal to the lateral direction (e.g., the x-direction, along 416).

In some examples, the mode selector 454 can receive a user selection of a height lock mode, such that while the height lock mode is selected, user-initiated movement of the puck 402 allows specification of the three-dimensional position 404 only within a virtual plane (e.g., a plane parallel to the x-z plane) having a constant elevation. In this mode, user-initiated movement of the puck 402 in the plane of the graphical user interface 400 moves the three-dimensional position 404 in the x- and z-directions, with a fixed value for y. The result of such movements may be indicated as a change in elevation angle in the displayed values of the three-dimensional position 404.

In some examples, the graphical user interface 400 can optionally include a first radius preset button 456, the pressing of which sets the radius to a first radius preset value. In the example of FIG. 4, the first radius preset value is zero, although other suitable values can also be used. In some examples, the first radius preset value can be slightly larger than zero, so that azimuth and elevation information are not lost when the radius is set to the first radius preset value. The graphical user interface 400 can optionally further include a second radius preset button 458, the pressing of which sets the radius to a second radius preset value, different from the first radius preset value. In the example of FIG. 4, the second radius preset value is 0.25, although other suitable values can also be used. The graphical user interface 400 can optionally further include a third radius preset button 460, the pressing of which sets the radius to a third radius preset value, different from the first and second radius preset values. In the example of FIG. 4, the third radius preset value is 1.0, although other suitable values can also be used. More or fewer than three radius preset buttons can also be used.

Thus far, there has been discussion of how to specify the three-dimensional position 404. At this point, it is beneficial to discuss what would be physically placed at the determined position.

For examples in which the system performs audio mixing of sound by placing a virtual sound source at the determined three-dimensional position 404, it can sometimes be desirable to impart a volume over which the virtual sound spreads. For example, a swarm of bees can produce a sound that appears to emanate from a full volume of the swarm, rather than from a single point.

To accommodate instances in which the virtual object to be placed at the determined three-dimensional position 404 has a specified volume, the graphical user interface 400 can include a spread controller, separate from the puck 402, that is user-adjustable to specify a volumetric spread of the simulated audio signal.

The spread controller elements 462, 464, 466, 468, and 470 can optionally be labeled with a spread controller label 472.

The spread controller can include a spread slider 462 and a spread slider controller 464 that is user-positionable along the spread slider 462 to set a value of the volumetric spread of the virtual object (such as a simulated audio signal). When the spread slider controller 464 is positioned at a first end of the spread slider 462, the volumetric spread is zero. As the spread slider controller 464 is positioned away from the first end of the spread slider 462, the volumetric spread of the virtual object increases.

The spread controller can further include a spread direct entry window 466 that can allow direct entry of a numerical value of the volumetric spread. In some examples, when a user directly enters a numerical value into the spread direct entry window 466, the spread slider controller 464 automatically moves to the corresponding location on the spread slider 462. In some examples, when a user positions the spread slider controller 464 along the spread slider 462, the spread direct entry window 466 automatically displays the numerical value corresponding to the spread slider controller 464 position.

The spread controller can further include a spread mode selector 470, labeled by spread mode selector label 468. The spread mode selector 470 can receive a user selection of a spread mode as being exactly one of: a source-relative spread mode, in which the volumes of virtual objects are spread over a volume proximate the specified three-dimensional position, or an observer/listener-relative spread mode, in which the volumes of virtual objects are spread over a volume proximate a three-dimensional position corresponding to the reference point on the graphical user interface.

In some examples, the volume can be spread over any suitable shape, with suitable symmetry or with controllable/defined orientation, including a sphere, a directional cone, and others. In the specific example of FIG. 4, the spread is over a sphere of a specified radius, centered at the origin or at the determined three-dimensional position 404.

Thus far, it has been assumed that a single virtual object is to be positioned at the determined three-dimensional position 404. There may be instances when it may be desirable to position multiple virtual objects at or near the three-dimensional position 404. For examples in which the system performs audio mixing of sound, it can be desirable to locate two sound sources together with a specified relationship between them. For example, a twin-engine airplane can produce sound independently from its two engines. The two engines can have a fixed relationship to one another, such as a fixed spacing. During normal operation, the engines remain at the same height as each other, with a spacing in the horizontal direction. During a fancy aerobatic maneuver, such as a roll, the engines can move helically about one another, while maintaining the same spacing between the engines.

To accommodate these multiple related virtual objects, the graphical user interface can include a source mode selector 474, which can specify how many virtual objects are to be placed and specify the positional relationship between the virtual objects.

In some examples, including the specific configuration shown in FIG. 4, the source mode selector 474 can receive a user selection of a single virtual object. For examples in which the system performs audio mixing of sound, this selection can correspond to a monaural audio signal. For this selected mode, the graphical user interface resembles the graphical user interface 400 of FIG. 4, where the user has selected a source mode of a mono source, and the height indicator 422 is a single graphic element positioned on the virtual line 424.

Figure 5:
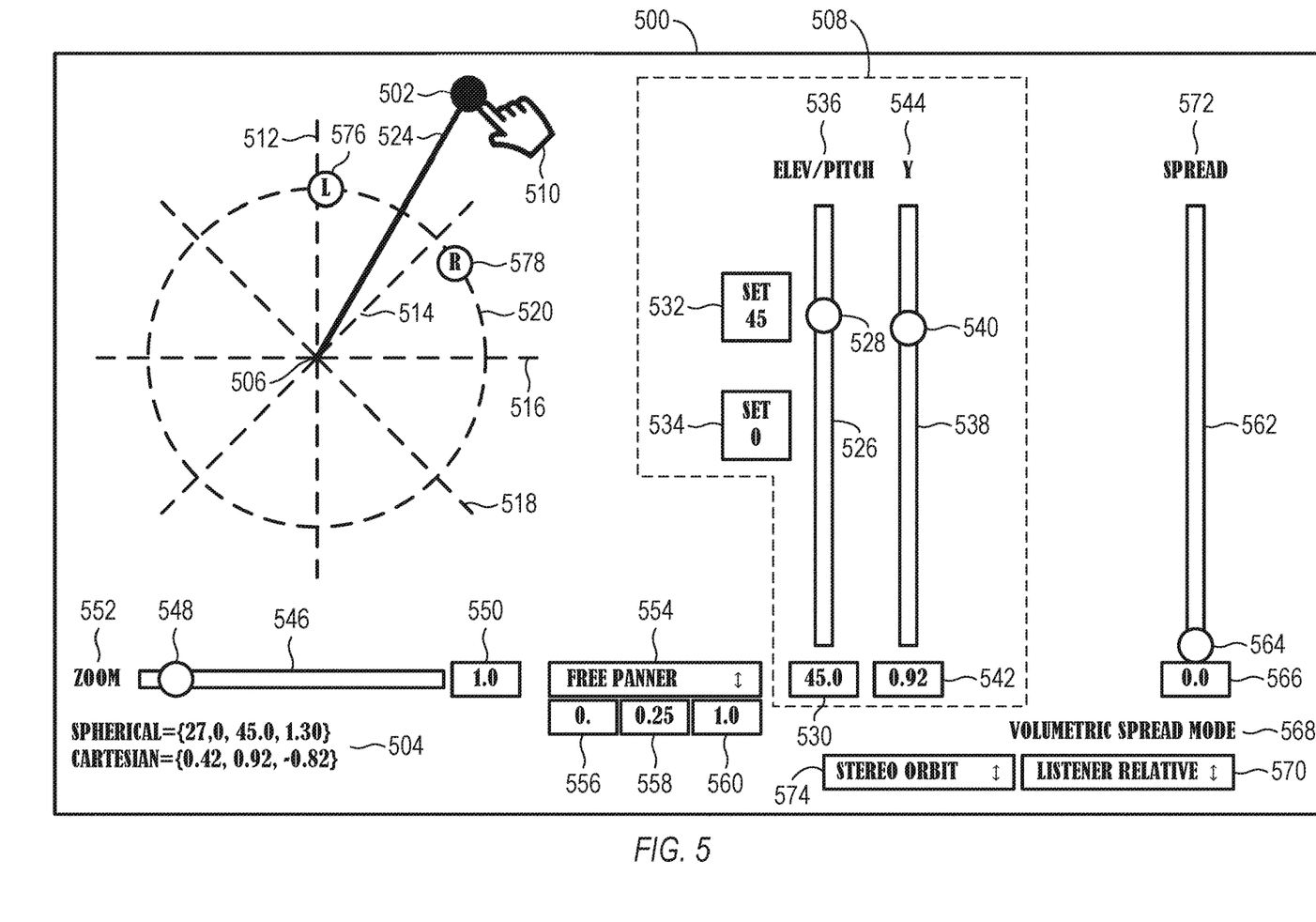
FIG. 5 shows an example of a graphical user interface in which a user has selected a stereo orbit mode on a source mode selector, in accordance with some embodiments.
Figure 6:
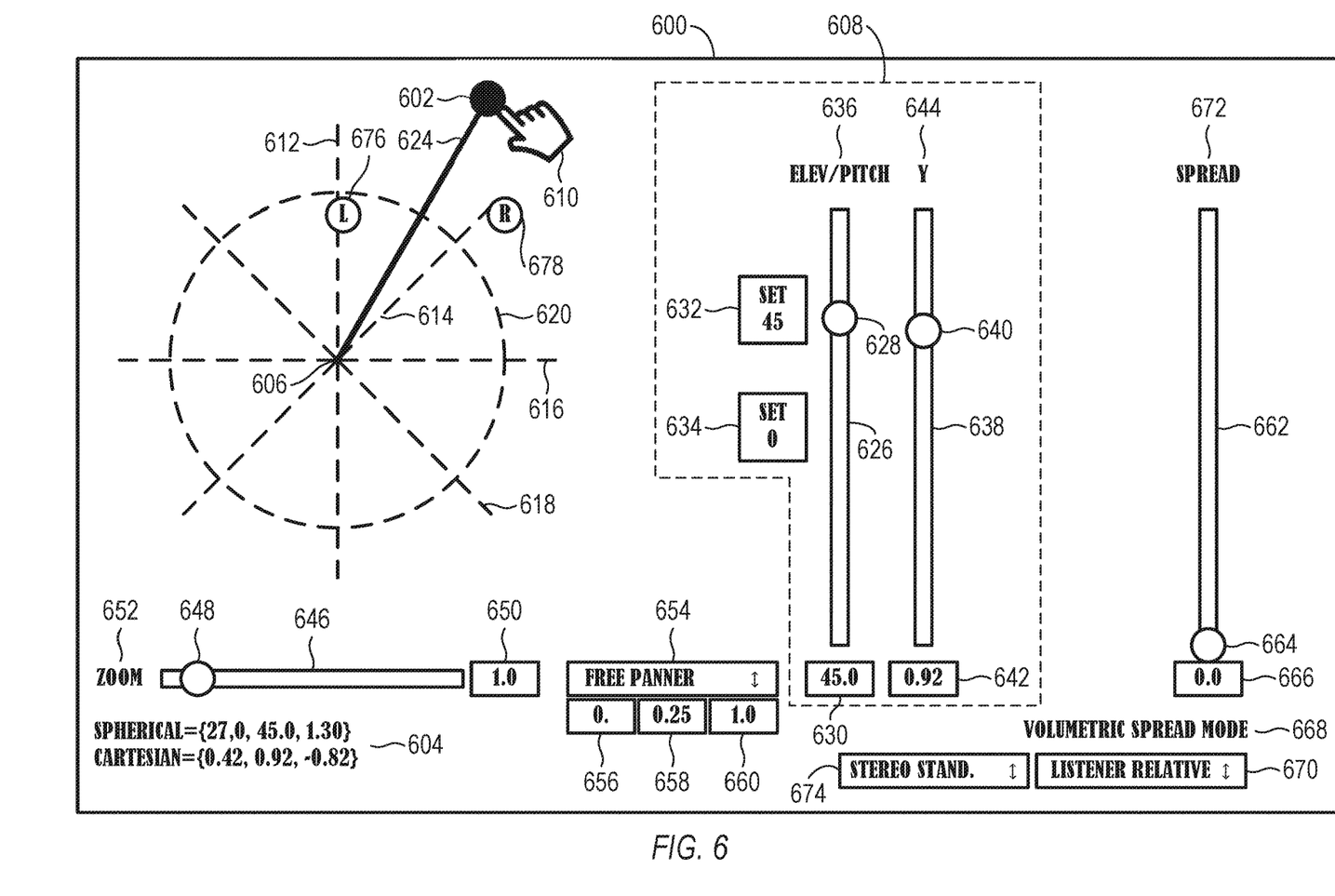
FIG. 6 shows an example of a graphical user interface in which a user has selected a stereo standard mode on a source mode selector, in accordance with some embodiments.

In some examples, the source mode selector 474 can receive a user selection of multiple virtual objects. FIGS. 5 and 6 show examples of graphical user interfaces that can accommodate multiple virtual objects.

FIG. 5 shows an example of a graphical user interface 500 in which a user has selected a stereo orbit mode on a source mode selector 574, in accordance with some embodiments. The graphical user interface 500 can be used with system 100, or with other suitable systems, to specify a three-dimensional position simultaneously for multiple virtual objects, such as audio sources. The graphical user interface 500 of FIG. 5 is but one example of a graphical user interface; other suitable graphical user interfaces can also be used. Elements numbered 502-572 in FIG. 5 are similar in structure and function to corresponding elements numbered 402-472 from FIG. 4.

Compared with the graphical user interface 400 of FIG. 4, in which a user has selected a mono audio source, the graphical user interface 500 of FIG. 5 accommodates a stereo audio source. The puck 502 and elevation controller 508 can position both audio sources simultaneously. To show the positions of both audio sources, the graphical user interface 500 has replaced the single height indicator 422 of FIG. 4 with a left channel height indicator 576 and a right channel height indicator 578.

In the example of FIG. 5, the left and right channel height indicators 576, 578 are at the same height and radius, and are azimuthally angled on opposite sides of the on a virtual line 524 extending between the puck 502 and the reference point 506. In some examples, left and right channel height indicators 576, 578 can have a virtual center that is positioned on the virtual line 524. In other examples, the left channel height indicator 576 can vary in height and/or radius from the right channel height indicator 578.

In the "orbit" mode selected at 574, user-initiated movement of the puck 502 can move both the left channel height indicator 576 and the right channel height indicator 578, together, in a motion that revolves around the reference point 506. For example, if the puck 502 is moved clockwise in a circle that surrounds the reference point 506, both the left channel height indicator 576 and the right channel height indicator 578 also move in respective circles around the reference point 506, but do so maintaining their symmetric relationship with the virtual line 524, where the left channel height indicator 576 is at an azimuth angle less than that of the virtual line 524, and the right channel height indicator 578 is at an azimuth angle greater than that of the virtual line 524.

FIG. 6 shows an example of a graphical user interface 600 in which a user has selected a stereo standard mode on a source mode selector 674, in accordance with some embodiments. The graphical user interface 600 can be used with system 100, or with other suitable systems, to specify a three-dimensional position simultaneously for multiple virtual objects, such as audio sources. The graphical user interface 600 of FIG. 6 is but one example of a graphical user interface; other suitable graphical user interfaces can also be used. Elements numbered 602-678 in FIG. 5 are similar in structure and function to corresponding elements numbered 502-578 from FIG. 4.

Compared with the orbit mode of FIG. 5, the left channel height indicator 676 and the right channel height indicator 678 now have a fixed spatial relationship between them, even as they are simultaneously repositioned by the puck 602. For example, the right channel height indicator 678 remains directly to the right of the left channel height indicator 676, regardless of where the puck 602 is moved. As a specific example, the standard mode is suitable for a two-engine passenger aircraft.

In the configurations of FIGS. 5 and 6, there can be additional controls (not shown) that can specify the spatial relationship between the left and right virtual objects.

In some examples, there can be additional selectable modes that can accommodate more than two virtual objects, such as n objects, or a user-specified number of objects. Such modes can be suitable for relatively large numbers of objects that maintain a generally fixed relationship to one another, such as a flock of seagulls flying overhead in formation.

In other examples, there can be additional selectable modes that can accommodate scene representations which operate as a unit. An audio-related example would be one of an ambisonic soundfield representation. Such a representation has one or more audio signals positioned in a single mix. In such a mode, the three-dimensional position controlled by the graphical interface is the orientation of the soundfield, where changes in azimuth or elevation angle equate to rotation of the soundfield. Similarly, positional information might equate to translations and radial changes might change the perceptual depth of the soundfield when rendered. It is understood that the specific mappings are dependent on the rendering capabilities of the audio representation and this is but one example.

Figure 7:
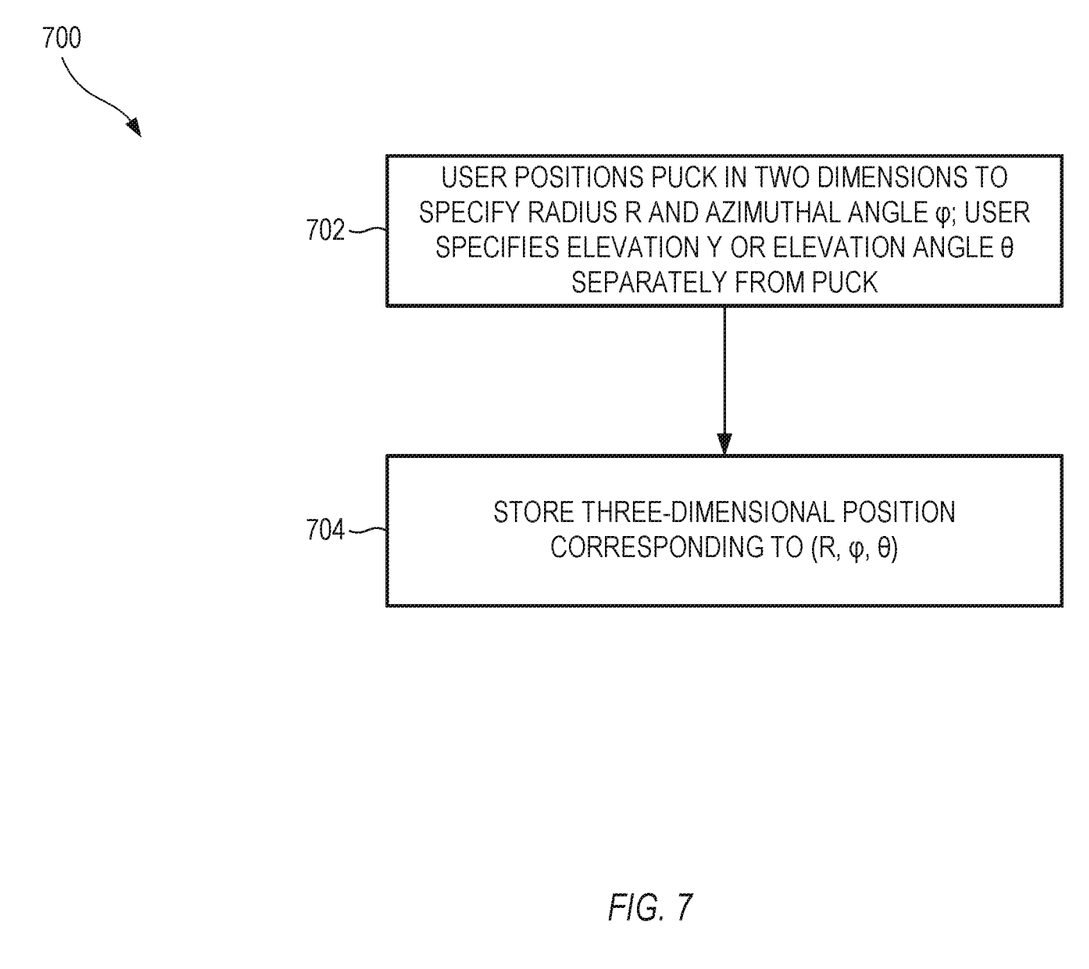
FIG. 7 shows a flowchart of an example of a method for specifying a three-dimensional position with a two-dimensional graphical user interface, in accordance with some embodiments.

FIG. 7 shows a flowchart of an example of a method 700 for specifying a three-dimensional position with a two-dimensional graphical user interface, in accordance with some embodiments. The method 700 can be executed using a processor coupled to any suitable graphical user interface, such as 400, 500, or 600.

At operation 702, a user-specified three-dimensional position can be received through a graphical user interface coupled to a processor and displayed on a display, the graphical user interface including a puck that is user-positionable in two dimensions to specify the three-dimensional position, such that a distance between the puck and a reference point on the graphical user interface determines a radius of the three-dimensional position, and an azimuthal orientation of the puck with respect to the reference point determines an azimuthal angle of the three-dimensional position, the graphical user interface further including an elevation controller, separate from the puck, that is user-adjustable to specify an elevation of the three-dimensional position.

At operation 704, data representing the specified three-dimensional position can be stored on a storage device coupled to the processor.

The method 700 can optionally further include receiving, with the processor, an audio signal; and generating, with the processor, a mixed audio signal that corresponds to a simulation of the audio signal propagating from the specified three-dimensional position.

Many other variations than those described herein will be apparent from this document. For example, depending on the embodiment, certain acts, events, or functions of any of the methods and algorithms described herein can be performed in a different sequence, can be added, merged, or left out altogether (such that not all described acts or events are necessary for the practice of the methods and algorithms). Moreover, in certain embodiments, acts or events can be performed concurrently, such as through multi-threaded processing, interrupt processing, or multiple processors or processor cores or on other parallel architectures, rather than sequentially. In addition, different tasks or processes can be performed by different machines and computing systems that can function together.

The various illustrative logical blocks, modules, methods, and algorithm processes and sequences described in connection with the embodiments disclosed herein can be implemented as electronic hardware, computer software, or combinations of both. To clearly illustrate this interchangeability of hardware and software, various illustrative components, blocks, modules, and process actions have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of this document.

The various illustrative logical blocks and modules described in connection with the embodiments disclosed herein can be implemented or performed by a machine, such as a general purpose processor, a processing device, a computing device having one or more processing devices, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor and processing device can be a microprocessor, but in the alternative, the processor can be a controller, microcontroller, or state machine, combinations of the same, or the like. A processor can also be implemented as a combination of computing devices, such as a combination of a DSP and a microprocessor, a plurality of microprocessors, one or more microprocessors in conjunction with a DSP core, or any other such configuration.

Embodiments of the automatic system and method described herein are operational within numerous types of general purpose or special purpose computing system environments or configurations. In general, a computing environment can include any type of computer system, including, but not limited to, a computer system based on one or more microprocessors, a mainframe computer, a digital signal processor, a portable computing device, a personal organizer, a device controller, a computational engine within an appliance, a mobile phone, a desktop computer, a mobile computer, a tablet computer, a smartphone, and appliances with an embedded computer, to name a few.

Such computing devices can typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, minicomputers, mainframe computers, audio or video media players, and so forth. In some embodiments the computing devices will include one or more processors. Each processor may be a specialized microprocessor, such as a digital signal processor (DSP), a very long instruction word (VLIW), or other micro-controller, or can be conventional central processing units (CPUs) having one or more processing cores, including specialized graphics processing unit (GPU)-based cores in a multi-core CPU.

The process actions or operations of a method, process, or algorithm described in connection with the embodiments of the automatic system and method disclosed herein can be embodied directly in hardware, in a software module executed by a processor, or in any combination of the two. The software module can be contained in computer-readable media that can be accessed by a computing device. The computer-readable media includes both volatile and non-volatile media that is either removable, non-removable, or some combination thereof. The computer-readable media is used to store information such as computer-readable or computer-executable instructions, data structures, program modules, or other data. By way of example, and not limitation, computer readable media may comprise computer storage media and communication media.

Computer storage media includes, but is not limited to, computer or machine readable media or storage devices such as Bluray discs (BD), digital versatile discs (DVDs), compact discs (CDs), floppy disks, tape drives, hard drives, optical drives, solid state memory devices, RAM memory, ROM memory, EPROM memory, EEPROM memory, flash memory or other memory technology, magnetic cassettes, magnetic tapes, magnetic disk storage, or other magnetic storage devices, or any other device which can be used to store the desired information and which can be accessed by one or more computing devices.

A software module can reside in the RAM memory, flash memory, ROM memory, EPROM memory, EEPROM memory, registers, hard disk, a removable disk, a CD-ROM, or any other form of non-transitory computer-readable storage medium, media, or physical computer storage known in the art. An exemplary storage medium can be coupled to the processor such that the processor can read information from, and write information to, the storage medium. In the alternative, the storage medium can be integral to the processor. The processor and the storage medium can reside in an application specific integrated circuit (ASIC). The ASIC can reside in a user terminal. Alternatively, the processor and the storage medium can reside as discrete components in a user terminal.

The phrase "non-transitory" as used in this document means "enduring or long-lived". The phrase "non-transitory computer-readable media" includes any and all computer-readable media, with the sole exception of a transitory, propagating signal. This includes, by way of example and not limitation, non-transitory computer-readable media such as register memory, processor cache and random-access memory (RAM).

The phrase "audio signal" is a signal that is representative of a physical sound.

Retention of information such as computer-readable or computer-executable instructions, data structures, program modules, and so forth, can also be accomplished by using a variety of the communication media to encode one or more modulated data signals, electromagnetic waves (such as carrier waves), or other transport mechanisms or communications protocols, and includes any wired or wireless information delivery mechanism. In general, these communication media refer to a signal that has one or more of its characteristics set or changed in such a manner as to encode information or instructions in the signal. For example, communication media includes wired media such as a wired network or direct-wired connection carrying one or more modulated data signals, and wireless media such as acoustic, radio frequency (RF), infrared, laser, and other wireless media for transmitting, receiving, or both, one or more modulated data signals or electromagnetic waves. Combinations of the any of the above should also be included within the scope of communication media.

Further, one or any combination of software, programs, computer program products that embody some or all of the various embodiments of the automatic system and method described herein, or portions thereof, may be stored, received, transmitted, or read from any desired combination of computer or machine-readable media or storage devices and communication media in the form of computer executable instructions or other data structures.

Embodiments of the automatic system and method described herein may be further described in the general context of computer-executable instructions, such as program modules, being executed by a computing device. Generally, program modules include routines, programs, objects, components, data structures, and so forth, which perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While the above detailed description has shown, described, and pointed out novel features as applied to various embodiments, it will be understood that various omissions, substitutions, and changes in the form and details of the devices or algorithms illustrated can be made without departing from the scope of the disclosure. As will be recognized, certain embodiments of the automatic system and method described herein can be embodied within a form that does not provide all of the features and benefits set forth herein, as some features can be used or practiced separately from others.

EXAMPLES

To further illustrate the device and related method disclosed herein, a non-limiting list of examples is provided below. Each of the following non-limiting examples can stand on its own or can be combined in any permutation or combination with any one or more of the other examples.

In Example 1, a system can include: a processor configured to: display a graphical user interface, receive a user-specified three-dimensional position through the graphical user interface, and store data representing the specified three-dimensional position on a storage device coupled to the processor, the graphical user interface comprising: a puck that is user-positionable in two dimensions to specify the three-dimensional position, such that a distance between the puck and a reference point on the graphical user interface determines a radius of the three-dimensional position, and an azimuthal orientation of the puck with respect to the reference point determines an azimuthal angle of the three-dimensional position; and an elevation controller, separate from the puck, that is user-adjustable to specify an elevation of the three-dimensional position.

In Example 2, the system of Example 1 can optionally be configured such that the elevation controller comprises an elevation angle controller configured to specify an elevation angle of the three-dimensional position.

In Example 3, the system of any one of Examples 1-2 can optionally be configured such that the elevation angle controller comprises an elevation angle slider and an elevation angle slider controller that is user-positionable along the elevation angle slider, such that: when the elevation angle slider controller approaches a first end of the elevation angle slider, the elevation angle approaches −90 degrees and the three-dimensional position approaches a bottom of a virtual sphere having the determined radius, when the elevation angle slider controller approaches a second end of the elevation angle slider, opposite the first end, the elevation angle approaches +90 degrees and the three-dimensional position approaches a top of the virtual sphere, and when the elevation angle slider controller moves between the first and second ends of the elevation angle slider, the three-dimensional position moves along a surface of the virtual sphere.

In Example 4, the system of any one of Examples 1-3 can optionally be configured such that the elevation angle controller further comprises: an elevation angle preset button, the pressing of which sets the elevation angle to an elevation angle preset value.

In Example 5, the system of any one of Examples 1-4 can optionally be configured such that the elevation controller comprises an elevation height controller configured to specify an elevation height value of the three-dimensional position, the elevation height value being a product of the radius of the three-dimensional position and a sine of an elevation angle of the three-dimensional position.

In Example 6, the system of any one of Examples 1-5 can optionally be configured such that the elevation height controller comprises an elevation height slider and an elevation height slider controller that is user-positionable along the elevation height slider, such that when the elevation height slider controller moves from a first position on the elevation height slider corresponding to a first positive elevation height, to a second position on the elevation height slider corresponding to a second positive elevation height greater than the first positive elevation height: the three-dimensional position moves along a line that is orthogonal to a plane defined by a locus of positions at which the elevation angle is zero and moves farther away from the plane, the radius of the three-dimensional position increases from a first radius value to a second radius value, and the elevation angle of the three-dimensional position increases from a first positive elevation angle value to a second positive elevation angle value.

In Example 7, the system of any one of Examples 1-6 can optionally be configured such that the elevation controller comprises an elevation angle controller configured to specify an elevation angle of the three-dimensional position, and an elevation height controller configured to specify an elevation height value of the three-dimensional position, the elevation height value being a product of the radius of the three-dimensional position and a sine of an elevation angle of the three-dimensional position, such that: adjusting an elevation angle with the elevation angle controller changes an elevation height value shown on the elevation height controller and does not move the puck on the graphical user interface; and adjusting an elevation height with the elevation height controller changes an elevation angle value shown on the elevation angle controller and moves the puck radially with respect to the reference point on the graphical user interface.

In Example 8, the system of any one of Examples 1-7 can optionally be configured such that the graphical user interface further comprises a mode selector that allows locking and unlocking of a position parameter, such that when the position parameter is locked, user-initiated movement of the puck allows specification of the three-dimensional position only along a surface of a virtual plane defined by the locked position parameter or over a surface of a virtual sphere defined by the locked position parameter.

In Example 9, the system of any one of Examples 1-8 can optionally be configured such that the mode selector is configured to receive a user selection of a radius lock mode, such that while the radius lock mode is selected, the radius of the three-dimensional position is fixed at a fixed radius value, and user-initiated movement of the puck allows specification of the three-dimensional position only over a surface of a virtual sphere having the fixed radius value.

In Example 10, the system of any one of Examples 1-9 can optionally be configured such that: the mode selector is configured to receive a user selection of a lateral lock mode, such that while the lateral lock mode is selected, user-initiated movement of the puck allows specification of the three-dimensional position only within a virtual plane that is orthogonal to a lateral direction; the mode selector is configured to receive a user selection of a front/back lock mode, such that while the front/back lock mode is selected, user-initiated movement of the puck allows specification of the three-dimensional position only within a virtual plane that is orthogonal to a front/back direction, the front/back direction being orthogonal to the lateral direction; the mode selector is configured to receive a user selection of a height lock mode, such that while the height lock mode is selected, user-initiated movement of the puck allows specification of the three-dimensional position only within a virtual plane having a constant elevation.

In Example 11, the system of any one of Examples 1-10 can optionally be configured such that the graphical user interface further comprises: a radius preset button, the pressing of which sets the radius of the three-dimensional position to a radius preset value.

In Example 12, the system of any one of Examples 1-11 can optionally be configured such that the graphical user interface further comprises: a height indicator configured to provide a visual indication of the elevation of the three-dimensional position, the height indicator being positioned on a virtual line extending between the puck and the reference point, a distance between the height indicator and the reference point on the graphical user interface corresponding to a radius of the three-dimensional position multiplied by a cosine of an elevation angle of the three-dimensional position, such that the height indicator is coincident with the puck when the elevation angle is zero and approaches the reference point when the elevation angle approaches −90 degrees or +90 degrees, the height indicator being exactly one of: a single graphic element positioned on the virtual line, the single graphic element corresponding to a position of a single virtual object, or a plurality of graphic elements, the plurality of graphic elements having a virtual center that is positioned on the virtual line, the plurality of graphic elements corresponding to positions of a plurality of virtual objects.

In Example 13, the system of any one of Examples 1-12 can optionally be configured such that the processor is further configured to receive an audio signal, and generate a mixed audio signal that corresponds to a simulation of the audio signal propagating from the specified three-dimensional position.

In Example 14, the system of any one of Examples 1-13 can optionally be configured such that the graphical user interface further comprises a spread controller, separate from the puck, that is user-adjustable to specify a volumetric spread of the simulated audio signal.

In Example 15, the system of any one of Examples 1-14 can optionally be configured such that the spread controller comprises: a spread slider and a spread slider controller that is user-positionable along the spread slider to set a value of the volumetric spread, such that when the spread slider controller is positioned at a first end of the spread slider, the volumetric spread of the simulated audio signal is zero.

In Example 16, the system of any one of Examples 1-15 can optionally further include a spread mode selector, the spread mode selector configured to receive a user selection of a spread mode as being exactly one of: a source-relative spread mode, in which the simulated audio signal is spread over a volume proximate the specified three-dimensional position, or a listener-relative spread mode, in which the simulated audio signal is spread over a volume proximate a three-dimensional position corresponding to the reference point on the graphical user interface.

In Example 17, a method can include: receiving a user-specified three-dimensional position through a graphical user interface coupled to a processor and displayed on a display, the graphical user interface including a puck that is user-positionable in two dimensions to specify the three-dimensional position, such that a distance between the puck and a reference point on the graphical user interface determines a radius of the three-dimensional position, and an azimuthal orientation of the puck with respect to the reference point determines an azimuthal angle of the three-dimensional position, the graphical user interface further including an elevation controller, separate from the puck, that is user-adjustable to specify an elevation of the three-dimensional position; and storing data representing the specified three-dimensional position on a storage device coupled to the processor.

In Example 18, the method of Example 17 can optionally further include: receiving, with the processor, an audio signal; and generating, with the processor, a mixed audio signal that corresponds to a simulation of the audio signal propagating from the specified three-dimensional position.

In Example 19, the method of any one of Examples 17-18 can optionally further include: spreading the simulated audio signal over a sphere having a specified radius.

In Example 20, a system can include: a processor configured to: display a graphical user interface, receive a user-specified three-dimensional position through the graphical user interface, and store data representing the specified three-dimensional position on a storage device coupled to the processor, the graphical user interface comprising: a puck that is user-positionable in two dimensions to specify the three-dimensional position, such that a distance between the puck and a reference point on the graphical user interface determines a radius of the three-dimensional position, and an azimuthal orientation of the puck with respect to the reference point determines an azimuthal angle of the three-dimensional position; an elevation controller, separate from the puck, that is user-adjustable to specify an elevation of the three-dimensional position; a mode selector that allows reversible locking of a position parameter, such that when the position parameter is locked, user-initiated movement of the puck allows specification of the three-dimensional position only along a surface of a virtual plane or over a surface of a virtual sphere; and a height indicator configured to provide a visual indication of the elevation of the three-dimensional position, the height indicator being positioned on a virtual line extending between the puck and the reference point, a distance between the height indicator and the reference point on the graphical user interface corresponding to a radius of the three-dimensional position multiplied by a cosine of an elevation angle of the three-dimensional position, such that the height indicator is coincident with the puck when the elevation angle is zero and approaches the reference point when the elevation angle approaches −90 degrees or +90 degrees, the height indicator being exactly one of: a single graphic element positioned on the virtual line, the single graphic element corresponding to a position of a single virtual object, or a plurality of graphic elements, the plurality of graphic elements having a virtual center that is positioned on the virtual line, the plurality of graphic elements corresponding to positions of a plurality of virtual objects.

What is claimed is:

1. A system, comprising:
a processor configured to:
   display a graphical user interface,
   receive a user-specified three-dimensional position through the graphical user interface, and
   store data representing the specified three-dimensional position on a storage device coupled to the processor,
the graphical user interface comprising:
   a puck that is user-positionable by being draggable by a cursor in the graphical user interface, the puck being draggable in two dimensions to specify the three-dimensional position, such that a distance between the puck and a reference point on the graphical user interface determines a radius of the three-dimensional position, and an azimuthal orientation of the puck with respect to the reference point determines an azimuthal angle of the three-dimensional position; and
   an elevation controller, separate from the puck, that is user-adjustable via software input in the graphical user interface to specify an elevation of the three-dimensional position.

2. The system of claim 1, wherein the elevation controller comprises an elevation angle controller configured to specify an elevation angle of the three-dimensional position.

3. The system of claim 2, wherein the elevation angle controller comprises an elevation angle slider and an elevation angle slider controller that is user-positionable along the elevation angle slider, such that:
   when the elevation angle slider controller approaches a first end of the elevation angle slider, the elevation angle approaches −90 degrees and the three-dimensional position approaches a bottom of a virtual sphere having the determined radius,
   when the elevation angle slider controller approaches a second end of the elevation angle slider, opposite the first end, the elevation angle approaches +90 degrees and the three-dimensional position approaches a top of the virtual sphere, and
   when the elevation angle slider controller moves between the first and second ends of the elevation angle slider, the three-dimensional position moves along a surface of the virtual sphere.

4. The system of claim 3, wherein the elevation angle controller further comprises:
   an elevation angle preset button, the pressing of which sets the elevation angle to an elevation angle preset value.

5. The system of claim 2, wherein the elevation controller comprises an elevation height controller configured to specify an elevation height value of the three-dimensional position, the elevation height value being a product of the radius of the three-dimensional position and a sine of an elevation angle of the three-dimensional position.

6. The system of claim 5, wherein the elevation height controller comprises an elevation height slider and an elevation height slider controller that is user-positionable along the elevation height slider, such that when the elevation height slider controller moves from a first position on the elevation height slider corresponding to a first positive elevation height, to a second position on the elevation height slider corresponding to a second positive elevation height greater than the first positive elevation height:
the three-dimensional position moves along a line that is orthogonal to a plane defined by a locus of positions at which the elevation angle is zero and moves farther away from the plane,
the radius of the three-dimensional position increases from a first radius value to a second radius value, and
the elevation angle of the three-dimensional position increases from a first positive elevation angle value to a second positive elevation angle value.

7. The system of claim 1, wherein the elevation controller comprises an elevation angle controller configured to specify an elevation angle of the three-dimensional position, and an elevation height controller configured to specify an elevation height value of the three-dimensional position, the elevation height value being a product of the radius of the three-dimensional position and a sine of an elevation angle of the three-dimensional position, such that:
adjusting an elevation angle with the elevation angle controller changes an elevation height value shown on the elevation height controller and does not move the puck on the graphical user interface; and
adjusting an elevation height with the elevation height controller changes an elevation angle value shown on the elevation angle controller and moves the puck radially with respect to the reference point on the graphical user interface.

8. The system of claim 1, wherein the graphical user interface further comprises a mode selector that allows locking and unlocking of a position parameter, such that when the position parameter is locked, user-initiated movement of the puck allows specification of the three-dimensional position only along a surface of a virtual plane defined by the locked position parameter or over a surface of a virtual sphere defined by the locked position parameter.

9. The system of claim 8, wherein the mode selector is configured to receive a user selection of a radius lock mode, such that while the radius lock mode is selected, the radius of the three-dimensional position is fixed at a fixed radius value, and user-initiated movement of the puck allows specification of the three-dimensional position only over a surface of a virtual sphere having the fixed radius value.

10. The system of claim 8, wherein:
the mode selector is configured to receive a user selection of a lateral lock mode, such that while the lateral lock mode is selected, user-initiated movement of the puck allows specification of the three-dimensional position only within a virtual plane that is orthogonal to a lateral direction;
the mode selector is configured to receive a user selection of a front/back lock mode, such that while the front/back lock mode is selected, user-initiated movement of the puck allows specification of the three-dimensional position only within a virtual plane that is orthogonal to a front/back direction, the front/back direction being orthogonal to the lateral direction; and
the mode selector is configured to receive a user selection of a height lock mode, such that while the height lock mode is selected, user-initiated movement of the puck allows specification of the three-dimensional position only within a virtual plane having a constant elevation.

11. The system of claim 1, wherein the graphical user interface further comprises:
a radius preset button, the pressing of which sets the radius of the three-dimensional position to a radius preset value.

12. The system of claim 1, wherein the graphical user interface further comprises:
a height indicator configured to provide a visual indication of the elevation of the three-dimensional position, the height indicator being positioned on a virtual line extending between the puck and the reference point, a distance between the height indicator and the reference point on the graphical user interface corresponding to a radius of the three-dimensional position multiplied by a cosine of an elevation angle of the three-dimensional position, such that the height indicator is coincident with the puck when the elevation angle is zero and approaches the reference point when the elevation angle approaches −90 degrees or +90 degrees,
the height indicator being exactly one of:
a single graphic element positioned on the virtual line, the single graphic element corresponding to a position of a single virtual object, or
a plurality of graphic elements, the plurality of graphic elements having a virtual center that is positioned on the virtual line, the plurality of graphic elements corresponding to positions of a plurality of virtual objects.

13. The system of claim 1, wherein the processor is further configured to receive an audio signal, and generate a mixed audio signal that corresponds to a simulation of the audio signal propagating from the specified three-dimensional position.

14. The system of claim 13, wherein the graphical user interface further comprises a spread controller, separate from the puck, that is user-adjustable to specify a volumetric spread of the simulated audio signal.

15. The system of claim 14, wherein the spread controller comprises:
a spread slider and a spread slider controller that is user-positionable along the spread slider to set a value of the volumetric spread, such that when the spread slider controller is positioned at a first end of the spread slider, the volumetric spread of the simulated audio signal is zero.

16. The system of claim 15, further comprising a spread mode selector, the spread mode selector configured to receive a user selection of a spread mode as being exactly one of:
a source-relative spread mode, in which the simulated audio signal is spread over a volume proximate the specified three-dimensional position, or
a listener-relative spread mode, in which the simulated audio signal is spread over a volume proximate a three-dimensional position corresponding to the reference point on the graphical user interface.

17. A method, comprising:
receiving a user-specified three-dimensional position through a graphical user interface coupled to a processor and displayed on a display, the graphical user interface including a puck that is user-positionable by being draggable by a cursor in the graphical user interface, the puck being draggable in two dimensions to specify the three-dimensional position, such that a distance between the puck and a reference point on the graphical user interface determines a radius of the three-dimensional position, and an azimuthal orientation of the puck with respect to the reference point determines an azimuthal angle of the three-dimensional position, the graphical user interface further including an elevation controller, separate from the puck, that is user-adjustable via software input in the graphical user interface to specify an elevation of the three-dimensional position; and storing data representing the specified three-dimensional position on a storage device coupled to the processor.

18. The method of claim 17, further comprising:
receiving, with the processor, an audio signal; and
generating, with the processor, a mixed audio signal that corresponds to a simulation of the audio signal propagating from the specified three-dimensional position.

19. The method of claim 18, further comprising:
spreading the simulated audio signal over a sphere having a specified radius.

20. A system, comprising:
a processor configured to:
 display a graphical user interface,
 receive a user-specified three-dimensional position through the graphical user interface, and
 store data representing the specified three-dimensional position on a storage device coupled to the processor,
the graphical user interface comprising:
 a puck that is user-positionable in two dimensions to specify the three-dimensional position, such that a distance between the puck and a reference point on the graphical user interface determines a radius of the three-dimensional position, and an azimuthal orientation of the puck with respect to the reference point determines an azimuthal angle of the three-dimensional position;
 an elevation controller, separate from the puck, that is user-adjustable to specify an elevation of the three-dimensional position;
 a mode selector that allows reversible locking of a position parameter, such that when the position parameter is locked, user-initiated movement of the puck allows specification of the three-dimensional position only along a surface of a virtual plane or over a surface of a virtual sphere; and
 a height indicator configured to provide a visual indication of the elevation of the three-dimensional position, the height indicator being positioned on a virtual line extending between the puck and the reference point, a distance between the height indicator and the reference point on the graphical user interface corresponding to a radius of the three-dimensional position multiplied by a cosine of an elevation angle of the three-dimensional position, such that the height indicator is coincident with the puck when the elevation angle is zero and approaches the reference point when the elevation angle approaches −90 degrees or +90 degrees,
the height indicator being exactly one of:
 a single graphic element positioned on the virtual line, the single graphic element corresponding to a position of a single virtual object, or
 a plurality of graphic elements, the plurality of graphic elements having a virtual center that is positioned on the virtual line, the plurality of graphic elements corresponding to positions of a plurality of virtual objects.

\* \* \* \* \*